(12) United States Patent
Hayakawa et al.

(10) Patent No.: US 11,054,326 B2
(45) Date of Patent: Jul. 6, 2021

(54) PHYSICAL QUANTITY SENSOR (71) Applicant: DENSO CORPORATION, Kariya (JP)

(72) Inventors: Yutaka Hayakawa, Kariya (JP); Hisanori Yokura, Kariya (JP)

(73) Assignee: DENSO CORPORATION, Kariya (JP)

( * ) Notice: Subject to any disclaimer, the term of this patent is extended or adjusted under 35 U.S.C. 154(b) by 184 days.

(21) Appl. No.: 16/511,115

(22) Filed: Jul. 15, 2019

(65) Prior Publication Data

US 2019/0339147 A1 Nov. 7, 2019

Related U.S. Application Data (63) Continuation of application No. PCT/JP2018/006453, filed on Feb. 22, 2018.

(30) Foreign Application Priority Data

Feb. 28, 2017 (JP) .............................. JP2017-037276

(51) Int. Cl.
*G01L 9/00* (2006.01)
*G01P 15/08* (2006.01)
*G01P 15/12* (2006.01)

(52) U.S. Cl.
CPC .......... *G01L 9/0042* (2013.01); *G01L 9/0054* (2013.01); *G01P 15/0802* (2013.01); *G01P 15/123* (2013.01)

(58) Field of Classification Search
None
See application file for complete search history.

(56) References Cited

U.S. PATENT DOCUMENTS 6,005,275 A * 12/1999 Shinogi ................. G01L 9/0042
257/417
2016/0187215 A1* 6/2016 Kawano ................. G01L 9/0054
73/723

\* cited by examiner

*Primary Examiner* — Lisa M Caputo
*Assistant Examiner* — Nigel H Plumb
(74) *Attorney, Agent, or Firm* — Posz Law Group, PLC (57) ABSTRACT

In a physical quantity sensor, a first substrate has a recess depressed from a second surface to provide a thin film section adjacent to a first surface, and a second substrate has a first surface bonded to the first surface of the first substrate, and has a hollow depressed from the first surface and facing the recess. The recess and the hollow have such sizes that a projected line defined by projecting an end of a bottom surface in the recess to the first surface of the first substrate surrounds an open end of the hollow. When the thin film section is displaced toward the hollow, a maximum tensile stress is generated at a position on a rear surface of the thin film section intersecting an extended line along a normal direction to the first surface of the first substrate and passing through the open end of the hollow.

5 Claims, 8 Drawing Sheets

PHYSICAL QUANTITY SENSOR

CROSS REFERENCE TO RELATED APPLICATIONS

The present application is a continuation application of International Patent Application No. PCT/JP2018/006453 filed on Feb. 22, 2018, which designated the U.S. and claims the benefit of priority from Japanese Patent Application No. 2017-37276 filed on Feb. 28, 2017. The entire disclosures of all of the above applications are incorporated herein by reference.

TECHNICAL FIELD

The present disclosure relates to a physical quantity sensor.

BACKGROUND

Conventionally, a physical quantity sensor having a thin film section has been proposed.

SUMMARY

The present disclosure provides a physical quantity sensor including a first substrate and a second substrate. The first substrate has a first surface and a second surface opposite to each other, and has a recess depressed from the second surface to provide a thin film section adjacent to the first surface. The second substrate has a first surface bonded to the first surface of the first substrate, and has a hollow depressed from the first surface at a portion facing the recess. The recess and the hollow have such sizes that a projected line defined by projecting an end of a bottom surface in the recess to the first surface of the first substrate surrounds an open end of the hollow. The thin film section has a front surface on the first surface of the first substrate and a rear surface that is opposite to the front surface and is closer to the second surface of the first substrate than the front surface is.

When a position on the rear surface of the thin film section intersecting an extended line that is along a normal direction to the first surface of the first substrate and passes through the open end of the hollow is defined as a specific position, the thin film section may be configured so that a maximum tensile stress is generated at the specific position when the thin film section is displaced toward the hollow.

When a position on the rear surface of the thin film section intersecting an extended line that is along a normal direction to the first surface of the first substrate and passes through the open end of the hollow is defined as a first position, the end of the bottom surface in the recess is defined as a second position, a shortest distance between the first position and the second position is defined as L [μm], and a thickness of the thin film section is define as d [μm], L>1.28×d+0.53 may be satisfied.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

A pressure sensor according to a related art includes a first substrate and a second substrate bonded to each other. The first substrate is formed using a silicon substrate or the like which is a brittle material. The first substrate has a first surface to be bonded to the second substrate and a second surface opposite to the first surface, and has a recess depressed from the second surface to provide a thin film section adjacent to the first surface. Further, on the first substrate, a gauge resistor having a resistance value changing in accordance with pressure is formed in the thin film section. The second substrate has a first surface to be bonded to the first surface of the first substrate and has a hollow depressed from the first surface at a portion facing the recess. The hollow provides a reference pressure chamber.

The hollow has an open end greater than a bottom surface of the recess formed in the first substrate. That is, the hollow is formed such that, when viewed from a normal direction to the first surface of the first substrate, the open end surrounds the end of the bottom surface of the recess formed in the first substrate. The end of the bottom surface of the recess is a boundary portion between the bottom surface of the recess and a side surface of the recess.

In the above-described pressure sensor, when a measurement medium is introduced into the recess, the thin film section is displaced in accordance with a pressure of the measurement medium, and the resistance value of the gauge resistor changes. Then, a sensor signal corresponding to the change in the resistance value is output.

The pressure sensor can be manufactured as follows, for example. That is, the gauge resistor and the like are formed on the first substrate. Further, the hollow is formed in the second substrate by etching or the like. Thereafter, the first substrate and the second substrate are bonded to each other, and the recess to provide the thin film section is formed on the first substrate by etching or the like, whereby the pressure sensor is manufactured.

In the semiconductor device, the hollow has the open end greater than the bottom surface of the recess formed in the first substrate. Therefore, when the measurement medium is introduced into the recess, the entire thin film section is displaced toward the hollow with the end on the bottom surface of the recess as a support. That is, the entire thin film section is displaced toward the hollow with the end of the thin film section as the support. In this case, the tensile stress generated in the thin film section is greatest at the end of the bottom surface of the recess.

However, while the recess is formed by etching or the like, the end of the bottom surface in the recess is the boundary portion between the bottom surface and the side surface and is a corner, and thus tends to vary in shape. Thus, in the pressure sensor, the maximum tensile stress tends to be generated at the end of the bottom surface of the recess which tends to vary in shape, and hence the maximum tensile stress generated in the thin film section tends to vary. Therefore, in the pressure sensor, since the breakdown voltage of the thin film section depends on the maximum tensile stress, the breakdown voltage of the thin film section tends to vary.

Although the pressure sensor has been described as an example here, the same applies to an acceleration sensor and an angular velocity sensor having a recess, a thin film section, and a hollow.

A physical quantity sensor according to a first aspect of the present disclosure includes a first substrate and a second substrate. The first substrate has a first surface and a second surface opposite to each other, and has a recess depressed from the second surface to provide a thin film section adjacent to the first surface. The second substrate has a first surface bonded to the first surface of the first substrate, and has a hollow depressed from the first surface at a portion facing the recess. The recess and the hollow have such sizes that a projected line defined by projecting an end of a bottom surface in the recess to the first surface of the first substrate surrounds an open end of the hollow. The thin film section has a front surface on the first surface of the first substrate and a rear surface that is opposite to the front surface and is closer to the second surface of the first substrate than the front surface is. When a position on the rear surface of the thin film section intersecting an extended line that is along a normal direction to the first surface of the first substrate and passes through the open end of the hollow is defined as a specific position, the thin film section is configured so that a maximum tensile stress is generated at the specific position when the thin film section is displaced toward the hollow.

A physical quantity sensor according to a second aspect of the present disclosure includes a first substrate and a second substrate. The first substrate has a first surface and a second surface opposite to each other, and has a recess depressed from the second surface to provide a thin film section adjacent to the first surface. The second substrate has a first surface bonded to the first surface of the first substrate, and has a hollow depressed from the first surface at a portion facing the recess. The recess and the hollow have such sizes that a projected line defined by projecting an end of a bottom surface in the recess to the first surface of the first substrate surrounds an open end of the hollow. The thin film section has a front surface on the first surface of the first substrate and a rear surface that is opposite to the front surface and is closer to the second surface of the first substrate than the front surface is. When a position on the rear surface of the thin film section intersecting an extended line that is along a normal direction to the first surface of the first substrate and passes through the open end of the hollow is defined as a first position, the end of the bottom surface in the recess is defined as a second position, a shortest distance between the first position and the second position is defined as L [μm], and a thickness of the thin film section is define as d [μm], $L > 1.28 \times d + 0.53$ is satisfied.

In the physical quantity sensor according to the first aspect of the present disclosure, the maximum tensile stress is generated at the specific position when the thin film section is displaced toward the hollow. Further, in the physical quantity sensor according to the second aspect of the present disclosure, the maximum tensile stress is generated at the first position when the thin film section is displaced toward the hollow. Therefore, the physical quantity sensors can restrict variation in the maximum tensile stress as compared with a case where the maximum tensile stress is generated at a corner. Thus, the physical quantity sensors can restrict variation in the breakdown voltage of the thin film section.

Hereinafter, embodiments of the present disclosure will be described with reference to the drawings. In the following embodiments, a description will be given while the same reference numerals are added to the same or equivalent components.

First Embodiment

A first embodiment will be described with reference to the drawings. In the present embodiment, an example in which a physical quantity sensor is applied to a pressure sensor will be described.

Figure 1:
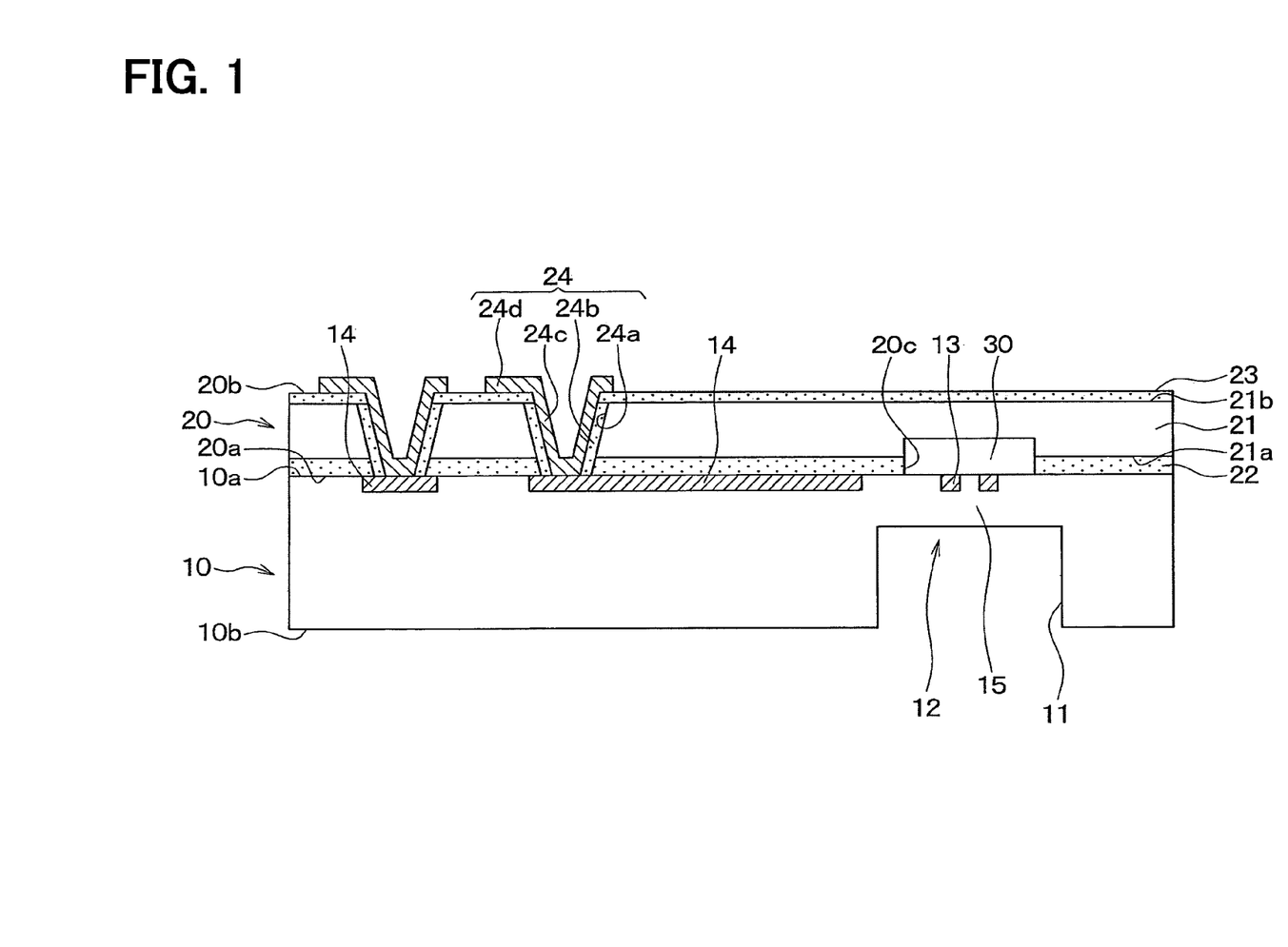
FIG. 1 is a cross-sectional view of a pressure sensor according to a first embodiment.

As shown in FIG. 1, the pressure sensor of the present embodiment has a configuration including a sensor substrate 10 and a cap substrate 20. In the present embodiment, the sensor substrate 10 corresponds to a first substrate and the cap substrate 20 corresponds to a second substrate.

The sensor substrate 10 is formed into a rectangular plate shape having first surface 10a and the second surface 10b and is made of a silicon substrate which is a brittle material. The sensor substrate 10 has a recess 11 depressed from the second surface 10b at a portion close to one end of the sensor substrate 10 to provide a thin film section 12 adjacent to the first surface 10a. In the present embodiment, the recess 11 has a rectangular cross section and an open end of the recess 11 has a circular shape. Note that the one end of the sensor substrate 10 in the present embodiment is a right end of the sensor substrate 10 in FIG. 1.

On the sensor substrate 10, four gauge resistors 13 having resistance values varying depending on pressure are formed at portions of the thin film section 12 adjacent to the first surface 10a so as to form a bridge circuit. Note that only two gauge resistors 13 are shown in FIG. 1

Further, on the sensor substrate 10, four wiring layers 14 are formed at portions adjacent to the first surface 10a. The wiring layers 14 are electrically connected to the connection points of the respective gauge resistors 13 in a different cross section from that of FIG. 1 and extended to the other end of the sensor substrate 10. Note that only two wiring layers 14 are shown in FIG. 1. Further, the other end of the sensor substrate 10 in the present embodiment is a left end of the sensor substrate 10 in FIG. 1.

The cap substrate 20 has a silicon substrate 21 having a first surface 21a and a second surface 21b, an insulating film 22 formed on the first surface 21a, and an insulating film 23 formed on the second surface 21b. Then, the insulating film 22 is bonded to the sensor substrate 10.

In the present embodiment, the surface of the insulating film 22 on the opposite side from the silicon substrate 21 is the first surface 20a of the cap substrate 20, and the surface of the insulating film 23 on the opposite side from the silicon substrate 21 is the second surface 20b of the cap substrate 20.

The cap substrate 20 has a hollow 20c depressed from the first surface 20a at a portion facing the bottom surface of the recess 11 in the sensor substrate 10. Thus, between the sensor substrate 10 and the cap substrate 20, a reference pressure chamber 30 is provided by a space between the sensor substrate 10 and the hollow 20c.

In the present embodiment, the hollow 20c has a rectangular cross section and an open end of the hollow 20c has a circular shape. Further, in the present embodiment, the sensor substrate 10 and the cap substrate 20 are bonded under a vacuum condition as described later. Hence, the reference pressure chamber 30 is set at a vacuum pressure.

The insulating film 22 is provided to insulate the sensor substrate 10 from the silicon substrate 21, and is formed of an oxide film or the like, and is formed on the entire surface of the first surface 21a of the silicon substrate 21. Note that FIG. 1 shows that the insulating film 22 is not formed on a portion of the surface of the silicon substrate 21 constituting the hollow 20c, but the insulating film 22 may be formed on the portion of the surface of the silicon substrate 21 constituting the hollow 20c.

In the cap substrate 20, multiple through electrode parts 24 penetrating the cap substrate 20 in a stacking direction of the sensor substrate 10 and the cap substrate 20 are formed. Specifically, each of the through electrode parts 24 includes: an insulating film 24b formed on a wall surface of a through hole 24a that penetrates the silicon substrate 21 and the insulating film 22 to expose the wiring layer 14; and a through electrode 24c disposed on the insulating film 24b and electrically connected to the wiring layer 14. In addition, each of the through electrode parts 24 includes a pad 24d that is connected to the through electrode 24c and disposed on the insulating film 23 and is electrically connected to an external circuit via a wire or the like.

Note that the insulating film 24b is made of, for example, tetraethyl orthosilicate (TEOS) or the like, and the through electrode 24c and the pad 24d are made of, for example, aluminum or the like.

Figure 2:
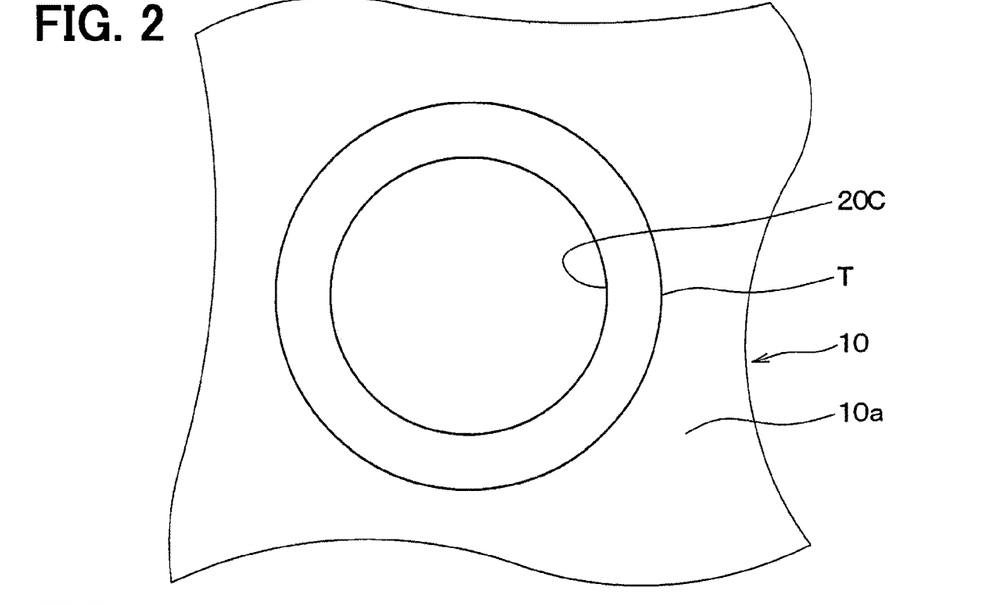
FIG. 2 is a plan view of a vicinity of a thin film section shown in FIG. 1.

The above is the basic structure of the pressure sensor according to the present embodiment. Next, a relationship between the recess 11 and the hollow 20c according to the present embodiment will be described. As shown in FIGS. 1 and 2, the hollow 20c is formed such that the open end is surrounded by a projected line T defined by projecting the end of the bottom surface in the recess 11 onto the first surface 10a of the sensor substrate 10. In other words, the hollow 20c is formed such that, when viewed from the normal direction to the first surface 10a of the sensor substrate 10, the open end of the hollow 20c is positioned in the bottom surface of the recess 11. In the present embodiment, the recess 11 and the hollows 20c are formed such that, when viewed from the normal direction to the first surface 10a of the sensor substrate 10, the center of the projected line T and the center of the open end of the hollow 20c coincide. That is, the recess 11 and the hollow 20c are formed such that, when viewed from the normal direction to the first surface 10a of the sensor substrate 10, the end of the bottom surface in the recess 11 and the open end of the hollow 20c are concentric.

Note that FIG. 2 is a plan view of a vicinity of the thin film section 12, and a solid line indicating the hollow 20c in FIG. 2 shows the open end of the hollow 20c. The end of the bottom surface in the recess 11 is a boundary portion between the bottom surface and the side surface of the recess 11.

Hence, an outer edge of the thin film section 12 on the first surface 10a is in a state bonded to the cap substrate 20. In other words, an end of a diaphragm 15, which is deformable in accordance with the pressure in the thin film section 12, is defined by the open end of the hollow 20c. That is, when viewed from a direction toward the first surface 10a of the sensor substrate 10, a portion of the thin film section 12 which is surrounded by the hollow 20c is a portion to function as the diaphragm 15. In the present embodiment, since the open end of the hollow 20c is formed into a circular shape, the diaphragm 15 also has a circular shape.

In such a pressure sensor, when a measurement medium is introduced into the recess 11, the diaphragm 15 is deformed in accordance with the pressure of the measurement medium, and the resistance value of the gauge resistor 13 changes due to the deformation of the diaphragm 15. As a result, a sensor signal corresponding to the deformation of the diaphragm 15 is output, and the pressure is detected.

At this time, a tensile stress and a compressive stress are generated in the thin film section 12 due to the deformation of the diaphragm 15. The breakdown voltage of the thin film section 12 depends on a yield stress of the material constituting the thin film section 12 and the maximum tensile stress generated in the thin film section 12, and decreases with an increase in the maximum tensile stress.

Figure 3:
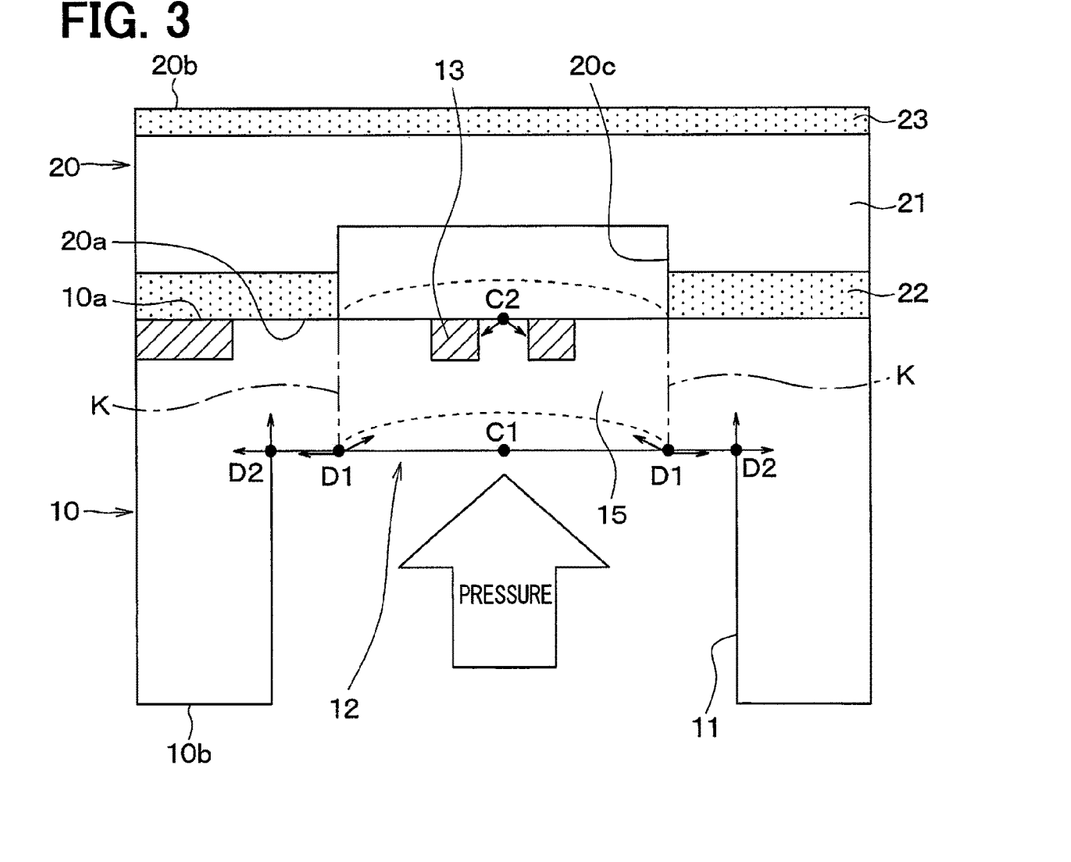
FIG. 3 is a schematic view showing main tensile stress generated in the thin film section.

Here, as shown in FIG. 3, the diaphragm 15 has a front surface on the first surface 10a of the sensor substrate 10, and a rear surface that is opposite to the front surface and is closer to the second surface 10b of the sensor substrate 10 than the front surface is. The thin film section 12 has a front surface on the first surface 10a of the sensor substrate 10, and a rear surface that is opposite to the front surface and is closer to the second surface 10b of the sensor substrate 10 than the front surface. In the present embodiment, the rear surface of the diaphragm 15 and the rear surface of the thin film section 12 are on the bottom surface in the recess 11. A center on the rear surface of the diaphragm 15 is defined as a first center position C1, and a center on the front surface of the diaphragm 15 is defined as a second center position C2. A position on the rear surface of the thin film section 12 intersecting an extended line K that is along the normal direction to the first surface 10a of the sensor substrate 10 and passes through the open end of the hollow 20c is defined as a first position D1. That is, in FIG. 3, the position directly under the open end of the hollow 20c on the rear surface of the thin film section 12 is defined as the first position D1. Further, on the rear surface of the thin film section 12, the end of the bottom surface in the recess 11 is defined as a second position D2.

In the present embodiment, the first position D1 corresponds to a specific position. Further, since the open end of the hollow 20c is formed into a circular shape, the first position D1 has a circularly continuous distribution. Similarly, since the end of the bottom surface in the recess 11 is formed into a circular shape, the second position D2 has a circularly continuous distribution.

When the measurement medium is introduced into the recess 11, as indicated by a dotted line in FIG. 3, the diaphragm 15 is displaced toward the hollow 20c, and a tensile stress indicated by an arrow is mainly generated. Then, the tensile stress generated on the rear surface of the thin film section 12 gradually increases from the first center position C1 toward the first position D1 and gradually decreases from the first position D1 to the second position D2. The tensile stress abruptly increases at the second position D2.

The reason why the tensile stress at the first position D1 is greater than at the first center position C1 is that the first position D1 serves as a portion for supporting the diaphragm 15 deformable in accordance with the pressure. The reason why the tensile stress gradually increases from the first center position C1 to the first position D1 is that the portion in the vicinity of the first position D1 is a plane and hence the tensile stress tends to be dispersed. On the other hand, the second position D2 is an end of the bottom surface in the recess 11 and is the boundary portion between the bottom surface and the side surface. That is, the second position D2 is a corner. Hence, the tensile stress is hardly dispersed and abruptly increases at the second position D2.

Figure 4:
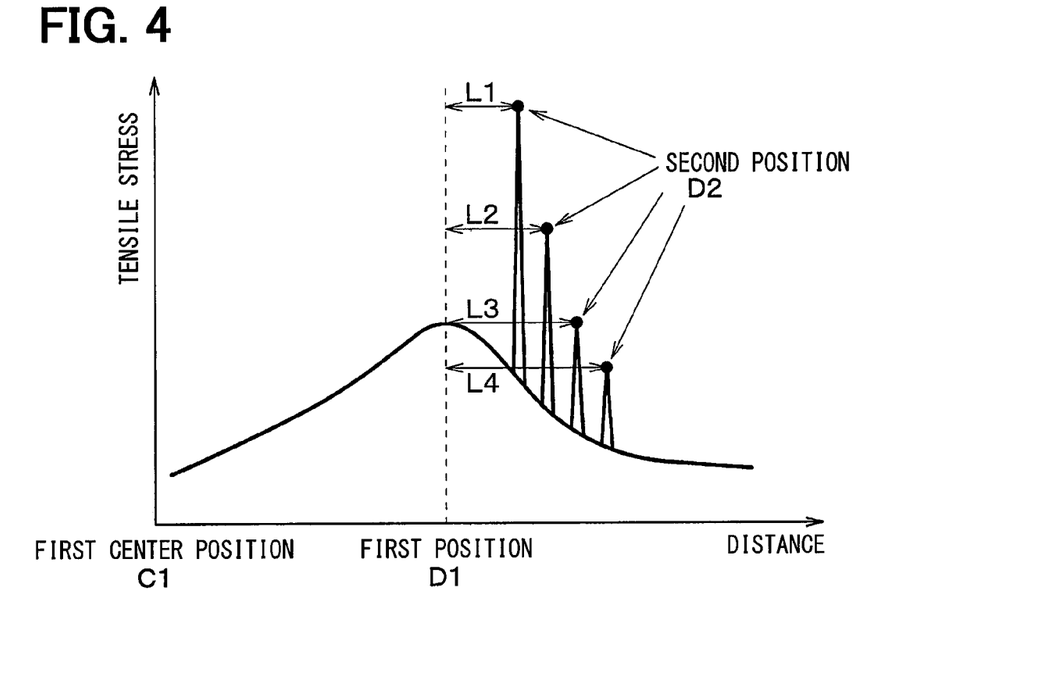
FIG. 4 is a diagram showing a relationship between tensile stress and a first position as well as a second position.

Further, the tensile stress at the second position D2 is mainly due to the deformation of the diaphragm 15. Therefore, as shown in FIG. 4, the tensile stress at the second position D2 varies with the distance to the first position D1.

For example, when the recess 11 and the hollow 20c are formed such that the distance between the first position D1 and the second position D2 is L1 or L2, the tensile stress at the first position D1 is smaller than the tensile stress at the second position D2. When the recess 11 and the hollow 20c are formed such that the distance between the first position D1 and the second position D2 is L3, the tensile stress at the first position D1 and the tensile stress at the second position D2 are the same. When the recess 11 and the hollow 20c are formed such that the distance between the first position D1 and the second position D2 is L4, the tensile stress at the first position D1 is greater than the tensile stress at the second position D2.

This is because, the longer the distance between the first position D1 and the second position D2, the more the tensile stress due to the deformation of the diaphragm 15 is relaxed at the portion between the first position D1 and the second position D2.

In the present embodiment, the recess 11 and the hollow 20c are formed such that the center of the projected line T and the center of the open end of the hollow 20c coincide. This circumferentially equalizes the distance between the first position D1 and the second position D2.

Figure 5:
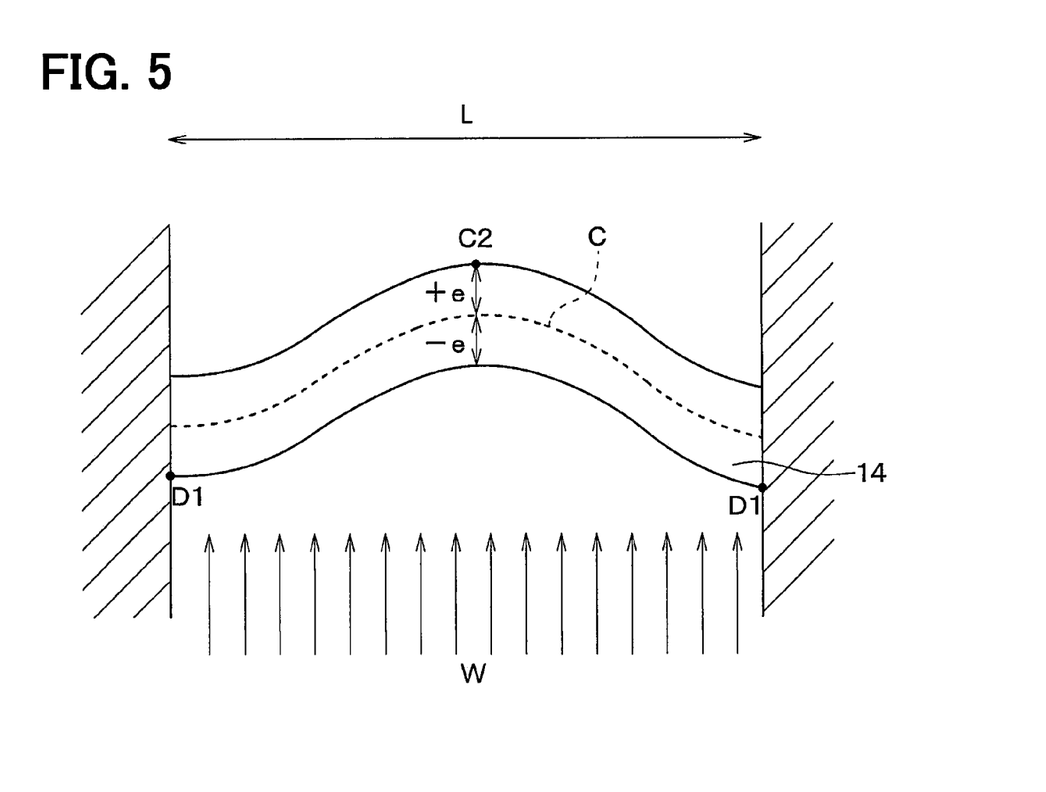
FIG. 5 is a view for explaining tensile stress at a time of displacement of a diaphragm toward a hollow.

Next, a magnitude relation between the tensile stress generated on the front surface of the thin film section 12 and the tensile stress generated on the rear surface of the thin film section 12 will be described. When pressure is applied to the rear surface of the diaphragm 15, the diaphragm 15 is displaced in a state where the end of the diaphragm 15 is a fixed end. At this time, the tensile stress generated on the front surface of the thin film section 12 is greatest at the second center position C2. Here, since the pressure is applied almost uniformly to the rear surface of the diaphragm 15, as shown in FIG. 5, the pressure applied to the diaphragm 15 is defined as an equally distributed load W and the length of the thin film section 12 is defined as L. In this case, a bending moment MC2 generated at the second center position C2 is expressed by the following formula.

$$MC2=(W \times L^2)/24 \quad \text{[Formula 1]}$$

Then, a tensile stress σC2 generated at the second center position C2 is expressed by the following formula when a section modulus of the thin film section 12 is defined as Z1.

$$\sigma C2=MC2/Z1 \quad \text{[Formula 2]}$$

Further, the section modulus Z1 is expressed by I/(+e) when a distance from a cross-sectional center C of to the front surface of the diaphragm 15 is defined as +e and a second moment of inertia of area is defined as I. The tensile stress σC2 is thus expressed by the following formula.

$$\sigma C2=\{(W \times L^2)/24\} \times \{(+e)/I\} \quad \text{[Formula 3]}$$

On the other hand, a bending moment MD1 generated at the first position D1 is expressed by the following formula.

$$MD1=(-W \times L^2)/12 \quad \text{[Formula 4]}$$

Then, a tensile stress σD1 generated at the first position D1 is expressed by the following formula when the section modulus of the thin film section 12 is defined as Z2.

$$\sigma D1=MD1/Z2 \quad \text{[Formula 5]}$$

Further, the section modulus Z2 is expressed by I/(−e) when a distance from the cross-sectional center C to the rear surface of the diaphragm 15 is defined as −e and the second moment of inertia of area is defined as I. The tensile stress σD1 is thus expressed by the following formula.

$$\sigma D1=\{(-W \times L^2)/12\} \times \{(-e)/I\} \quad \text{[Formula 6]}$$

Hence, the tensile stress generated at the first position D1 is always greater than the tensile stress generated at the second center position C2. That is, in the pressure sensor as described above, the breakdown voltage of the thin film section 12 depends on the tensile stress generated at the first position D1 or the tensile stress generated at the second position D2.

As described above, since the shape of the second position D2 which is a corner is formed by etching or the like, the shape tends to vary as compared with the shape of the first position D1 which is a plane. For this reason, in the pressure sensor in which the tensile stress generated at the second position D2 is greatest among those generated in the thin film section 12, the breakdown voltage of the thin film section 12 varies. Therefore, in the present embodiment, the recess 11 and the hollow 20c are formed such that, when the thin film section 12 is displaced toward the hollow 20c, the tensile stress generated at the first position D1 is greater than the tensile stress generated at the second position D2. That is, in the present embodiment, the recess 11 and the hollow 20c are formed such that, when the thin film section 12 is displaced, the maximum tensile stress is generated at the first position D1 of the thin film section 12.

Figure 6:
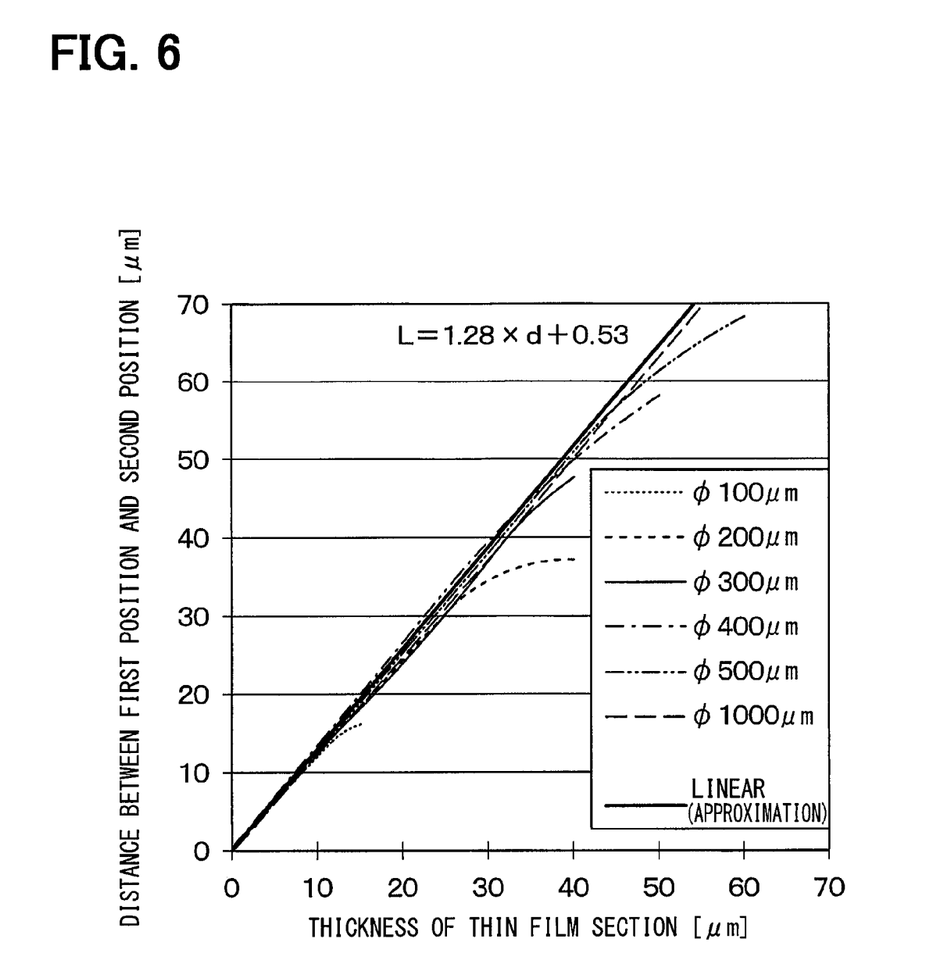
FIG. 6 is a diagram showing a relationship between a thickness of the thin film section and a distance between the first position and the second position.

In more detail, the tensile stress generated at the first position D1 and the tensile stress generated at the second position D2 also depend on the thickness of the thin film section 12 as shown in FIG. 6. The second position D2 of the distance between the first position D1 and the second position D2 in FIG. 6 is a position where tensile stress equal to the tensile stress generated at the first position D1 is generated. That is, the second position D2 of the distance between the first position D1 and the second position D2 in FIG. 6 is the position separated from the first position D1 by the distance L3 in FIG. 4. FIG. 6 is a result of simulation in which the maximum length of the diaphragm 15 passing through the second center position C2 is set to 100 μm to 1000 μm. Note that the maximum length of the diaphragm 15 passing through the second center position C2 is, for example, a diameter when the diaphragm 15 is circular and a diagonal when the diaphragm 15 is square. In the present embodiment, since the diaphragm 15 is formed into a circular shape, the maximum length is shown as φ in FIG. 6.

As shown in FIG. 6, it is confirmed that the following formula only needs to be satisfied so as to make the tensile stress at the first position D1 greater than the tensile stress at the second position D2 when the distance between the first position D1 and the second position D2 is defined as L [μm] and the thickness of the thin film section 12 is defined as d [μm].

$$L > 1.28 \times d + 0.53 \quad \text{[Formula 7]}$$

Therefore, in the present embodiment, the recess 11, the thin film section 12, and the hollow 20c are formed so as to satisfy Formula 7.

The above is the configuration of the pressure sensor according to the present embodiment. Next, a method for manufacturing the pressure sensor will be briefly described with reference to FIGS. 7A to 7D.

Figure 7A:
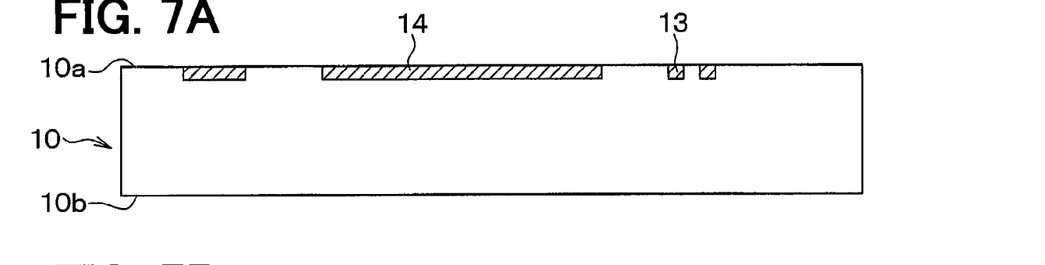
FIG. 7A is a cross-sectional view showing a manufacturing process of the pressure sensor shown in FIG. 1.

First, as shown in FIG. 7A, the sensor substrate 10 is prepared, and the gauge resistor 13 and the wiring layer 14 are formed on the sensor substrate 10.

Figure 7B:
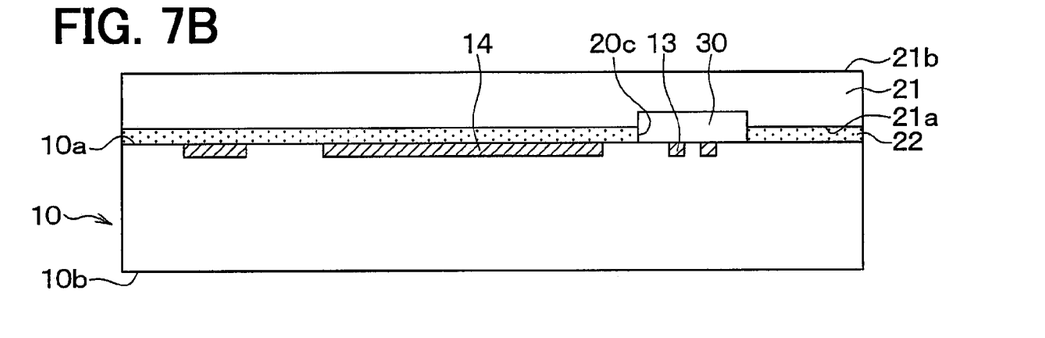
FIG. 7B is a cross-sectional view showing a manufacturing process of the pressure sensor continued from FIG. 7A.

Further, as shown in FIG. 7B, a silicon substrate 21 constituting the cap substrate 20 is prepared, and the insulating film 22 is formed on the first surface 21a of the silicon substrate 21 by a thermal oxidation method or the like. Thereafter, the hollow 20c is formed by dry etching or the like. Then, the sensor substrate 10 and the silicon substrate 21 with the insulating film 22 formed thereon are bonded to each other. Although not particularly limited, the bonding of the sensor substrate 10 and the insulating film 22 is performed by direct bonding.

In the case of bonding the sensor substrate 10 and the insulating film 22 by direct bonding, for example, first, the sensor substrate 10 and the silicon substrate 21 with the insulating film 22 formed thereon are placed in a vacuum device. Then, the sensor substrate 10 and the insulating film 22 are irradiated with $N_2$ plasma, $O_2$ plasma, or Ar ion beam to activate the respective surfaces of the sensor substrate 10 and the insulating film 22.

Next, in the vacuum device, alignment is performed with an infrared microscope or the like using alignment marks appropriately provided on the sensor substrate 10 and the silicon substrate 21, and the sensor substrate 10 and the insulating film 22 are bonded to each other at room temperature to 550° C. Thereby, a reference pressure chamber 30 which is set to vacuum pressure is formed between the sensor substrate 10 and the hollow 20c.

Figure 7C:
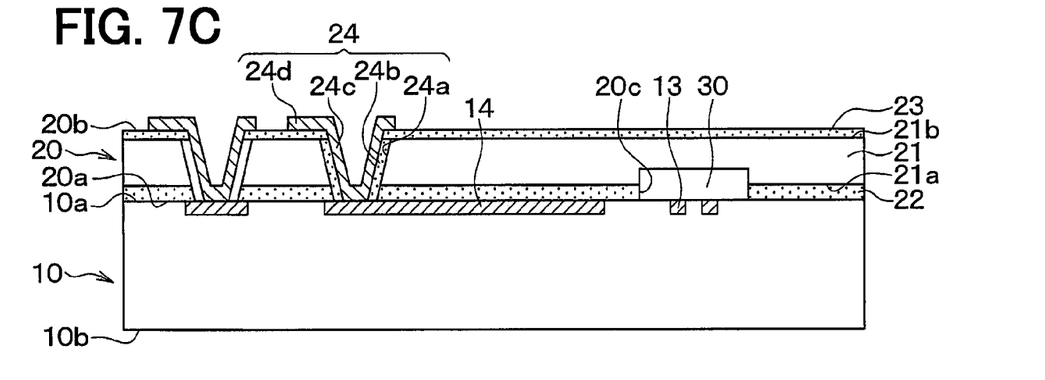
FIG. 7C is a cross-sectional view showing a manufacturing process of the pressure sensor continued from FIG. 7B.

Subsequently, as shown in FIG. 7C, the through electrode parts 24 are formed on the cap substrate 20. Specifically, a mask (not shown) is formed on the second surface 21b of the silicon substrate 21, and dry etching or the like is performed to form through holes 24a reaching the wiring layer 14. Next, the insulating film 24b such as TEOS is formed on the wall surface of each through hole 24a. At this time, the insulating film 23 is made of the insulating film formed on the second surface 21b of the silicon substrate 21. That is, the insulating film 23 and the insulating film 24b are formed in the same step.

Thereafter, the insulating film 24b formed at the bottom of each through hole 24a is removed, thereby exposing the wiring layer 14 from each through hole 24a. Then, a metal film is formed in each through hole 24a by a sputtering method, a vapor deposition method, or the like, so that a through electrode 24c electrically connected to the wiring layer 14 is formed. Further, the metal film formed on the insulating film 23 is appropriately patterned to form the pad 24d. In this manner, the through electrode parts 24 are formed on the cap substrate 20.

Figure 7D:
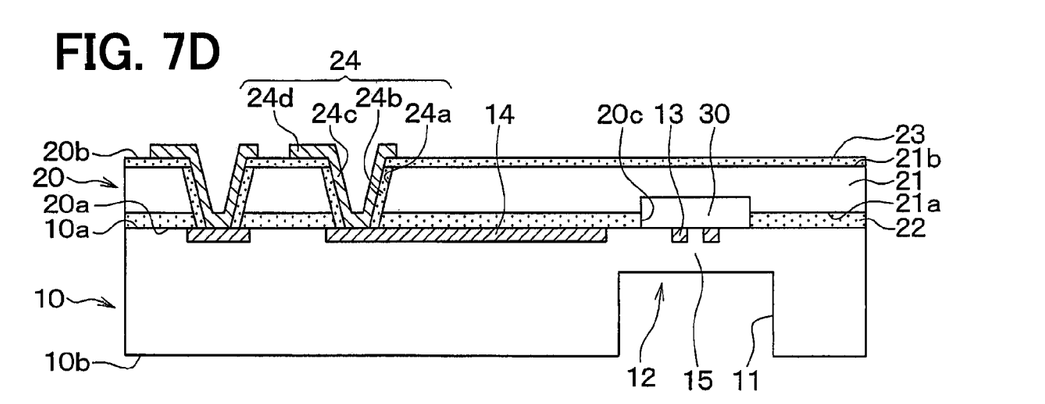
FIG. 7D is a cross-sectional view showing a manufacturing process of the pressure sensor continued from FIG. 7C.

Subsequently, as shown in FIG. 7D, a mask (not shown) is formed on the second surface 10b of the sensor substrate 10, and dry etching or the like is performed to form the recess 11 such that the relationship between the hollow 20c and the thin film section 12 satisfies Formula 7. In this way, the pressure sensor shown in FIG. 1 is manufactured.

Although the method for manufacturing one pressure sensor has been described above, the sensor substrate 10 and the silicon substrate 21 in a wafer form may be prepared, may be subjected to the above process while kept in the wafer form, and may be divided into units of chips by dicing.

As described above, in the present embodiment, the recess 11 and the hollow 20c are formed such that, when the measurement medium is introduced into the recess 11, the tensile stress generated at the first position D1 is greater than the tensile stress generated at the second position D2. In more detail, the recess 11, the thin film section 12, and the hollow 20c are formed so as to satisfy Formula 7. Hence, the breakdown voltage of the thin film section 12 depends on the tensile stress generated at the first position D1. Since the periphery of the first position D1 is a plane, processing variation is small as compared with the second position D2 which is a corner. It is thereby possible to restrict the variation in the breakdown voltage of the thin film section 12.

Further, the tensile stress generated at the first position D1 is made greater than the tensile stress generated at the second position D2. Therefore, for example, as compared with the case where the distance between the first position D1 and the second position D2 in FIG. 4 is L1 or L2, the magnitude of the maximum tensile stress itself generated in the thin film section 12 can be reduced. That is, it is possible to improve the breakdown voltage of the thin film section 12.

Further, in the present embodiment, the recess 11 and the hollow 20c each have the open end in a circular shape and have the rectangular cross section. Hence, the first position D1 and the second position D2 are circularly continuous positions, thus enabling suppression of an abrupt increase in the tensile stress in one portion with respect to the other portion. Therefore, it is possible to simplify the design of the breakdown voltage of the thin film section 12.

Other Embodiments

Although the present disclosure has been described in accordance with the embodiment, it is understood that the present disclosure is not limited to the embodiment and the structure. The present disclosure encompasses various modifications and variations within an equivalent scope. In addition, various combinations and forms, as well as other combinations and forms including only one element, more than that, or less than that, are also within the scope and the idea of the present disclosure.

Figure 8:
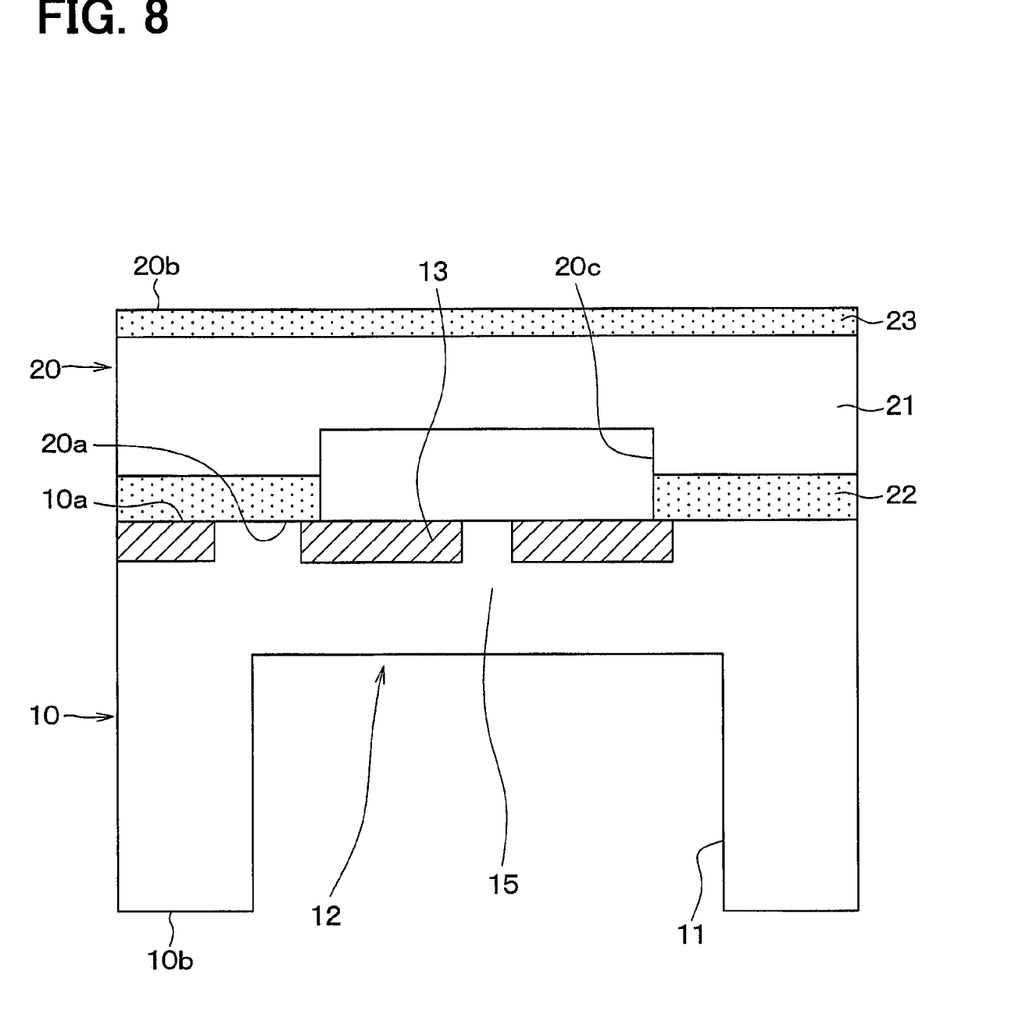
FIG. 8 is a cross-sectional view of a vicinity of a thin film section according to another embodiment.

For example, as shown in FIG. 8, the gauge resistor 13 may be extended from the inside to the outside of the hollow 20c in the silicon substrate 21.

Figure 9:
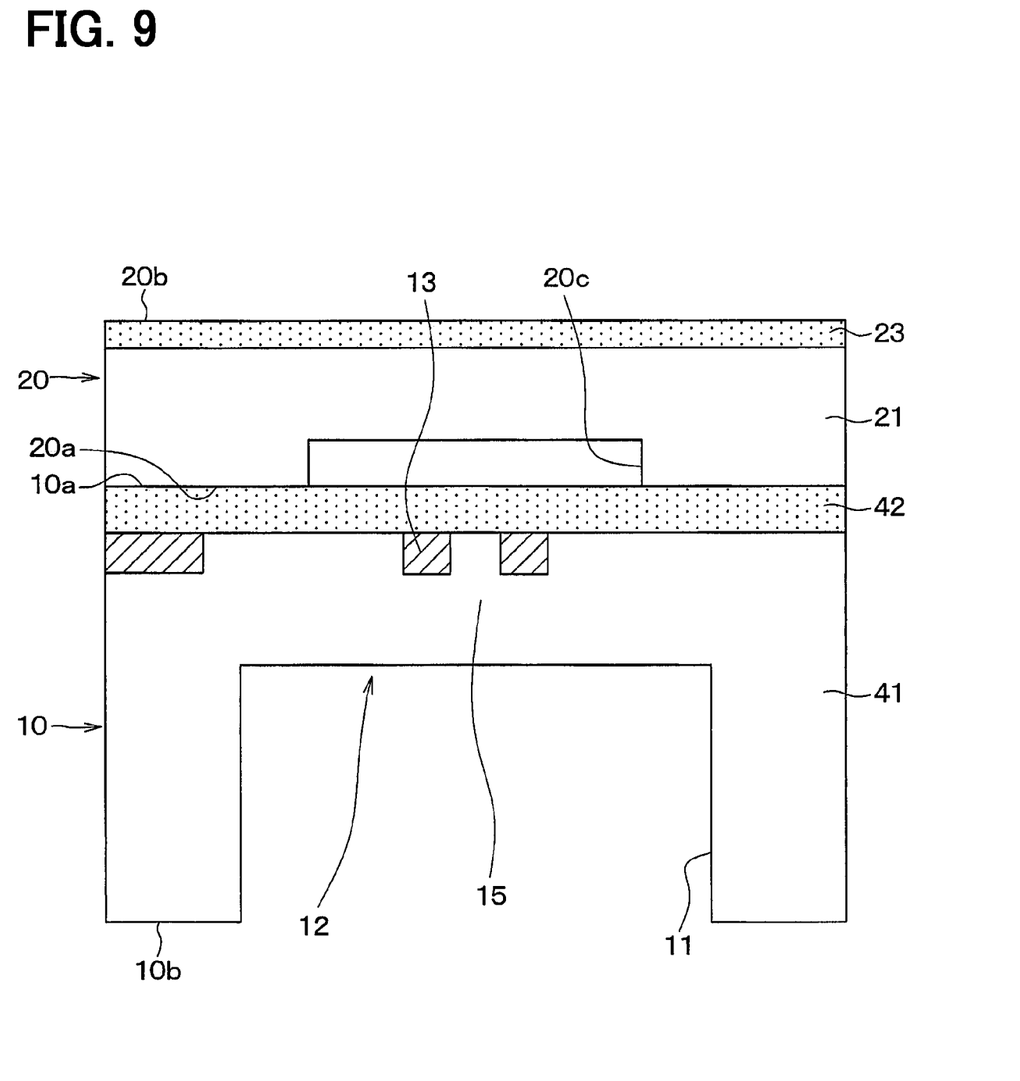
FIG. 9 is a cross-sectional view of a vicinity of a thin film section according to another embodiment.

As shown in FIG. 9, the sensor substrate 10 may be configured to have a silicon substrate 41 and an insulating film 42 formed on the silicon substrate 41, and the cap substrate 20 may be configured to have a silicon substrate 21 and an insulating film 23. The pressure sensor may be formed by bonding the insulating film 42 of the sensor substrate 10 and the silicon substrate 21 of the cap substrate 20 to each other. In the case of this configuration, the gauge resistor 13 and the wiring layer 14 are formed on the silicon substrate 41. Further, the thin film section 12 has a structure including the silicon substrate 41 and the insulating film 42. The first surface 10a of the sensor substrate 10 is formed of the insulating film 42, and the first surface 20a of the cap substrate 20 is formed of the silicon substrate 21.

Figure 10:
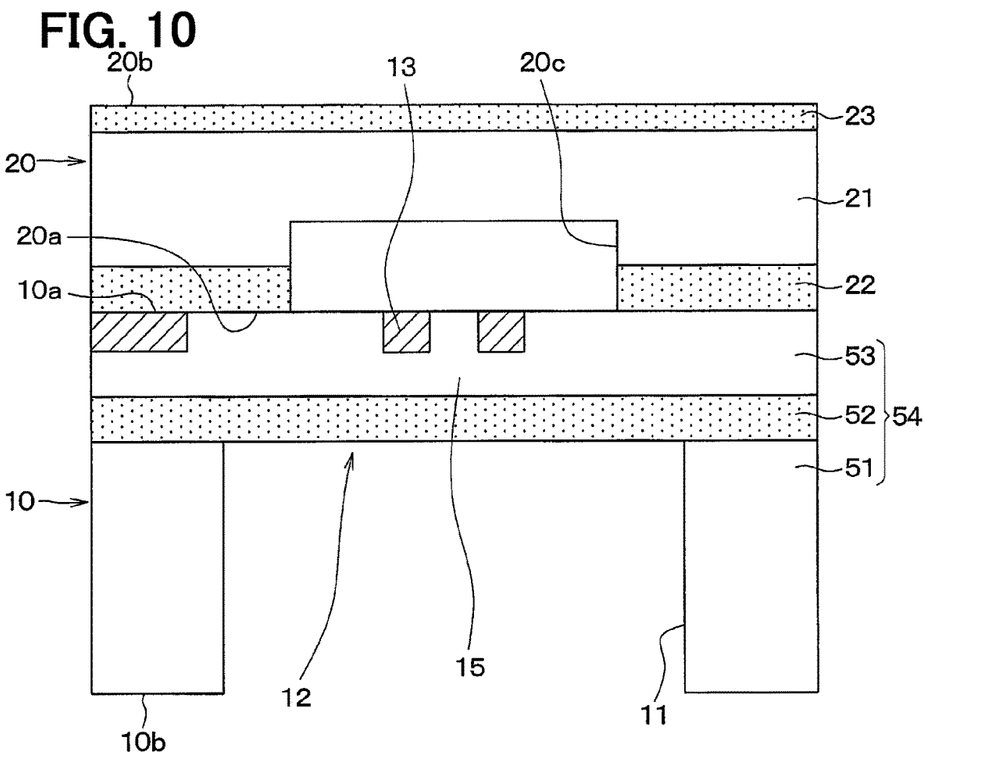
FIG. 10 is a cross-sectional view of a vicinity of a thin film section according to another embodiment.

Furthermore, as shown in FIG. 10, the sensor substrate 10 may be configured using a silicon on insulator (SOI) substrate 54 in which a support substrate 51, an insulating film 52, and a semiconductor layer 53 are stacked sequentially. In this case, for example, the recess 11 reaching the insulating film 52 is formed in the support substrate 51, so that the thin film section 12 is made up of the insulating film 52 and the semiconductor layer 53. Note that the recess 11 may be formed so as to reach the semiconductor layer 53. In this case, the semiconductor layer 53 constitutes the thin film section 12.

Figure 11:
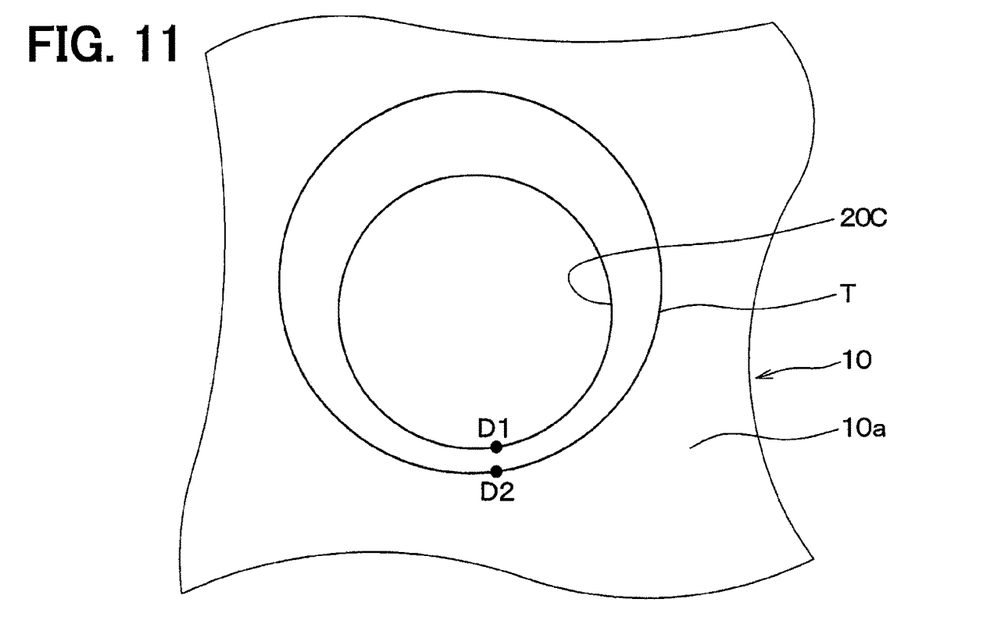
FIG. 11 is a plan view of a vicinity of a thin film section according to another embodiment.

Further, as shown in FIG. 11, the center of the projected line T may be different from the center of the open end of the hollow 20c. In the case of such a configuration, the distance between the first position D1 and the second position D2 is not uniform. Therefore, in the case of such a configuration, the recess 11, the hollow 20c, and the thin film section 12 may be formed such that the distance of the portion where the distance between the first position D1 and the second position D2 is the shortest satisfies Formula 7 above. That is, the recess 11, the hollow 20c, and the thin film section 12 may be formed such that the distance between the first position D1 and the second position D2 shown in FIG. 11 satisfies Formula 7 above. Note that the second position D2 in the portion where the distance between the first position D1 and the second position D2 is the shortest is, in other words, the position where the maximum tensile stress is generated in the second position D2.

Further, the shape of the open end of the recess 11 can be changed appropriately. For example, the open end of the recess 11 may be formed into a rectangular shape or an octagonal shape. Similarly, the open end of the hollow 20c may be formed into a rectangular shape or an octagonal shape. The shape of the open end of the recess 11 may be different from the shape of the open end of the hollow 20c, and for example, the open end of the recess 11 may be formed into a rectangular shape while the open end of the hollow 20c may be formed into an octagonal shape. In the case of forming such a configuration, as shown in FIG. 11, the distance between the first position D1 and the second position D2 is not uniform. Therefore, in the case of forming such a configuration, the recess 11, the hollow 20c, and the thin film section 12 may be formed such that the portion where the distance between the first position D1 and the second position D2 is the shortest satisfies Formula 7 above.

Moreover, the recess 11 does not need to have the rectangular cross section but may have a tapered cross section, for example, which is narrowed from the open-end toward the bottom surface. Similarly, the hollow 20c does not need to have the rectangular cross section but may have a tapered cross section, for example, which is narrowed from the open end toward the bottom surface.

Furthermore, the sensor substrate 10 and the cap substrate 20 need not be directly bonded to each other. For example, the sensor substrate 10 and the cap substrate 20 may be bonded by appropriately disposing a metal member or the like and performing metal bonding, eutectic bonding, or the like. The sensor substrate 10 and the cap substrate 20 may be bonded via glass or the like.

In the first embodiment, the relationship among the recess 11, the thin film section 12, and the hollow 20c may be applied to another physical quantity sensor such as an acceleration sensor or an angular velocity sensor.

What is claimed is:

1. A physical quantity sensor comprising:
a first substrate having a first surface and a second surface opposite to each other, and having a recess depressed from the second surface to provide a thin film section adjacent to the first surface; and
a second substrate having a first surface bonded to the first surface of the first substrate, and having a hollow depressed from the first surface at a portion facing the recess, wherein
the recess and the hollow have such sizes that a projected line defined by projecting an end of a bottom surface in the recess to the first surface of the first substrate surrounds an open end of the hollow,
the thin film section has a front surface on the first surface of the first substrate and a rear surface that is opposite to the front surface and is closer to the second surface of the first substrate than the front surface is, and
when a position on the rear surface of the thin film section intersecting an extended line that is along a normal direction to the first surface of the first substrate and passes through the open end of the hollow is defined as a specific position, the thin film section is configured so that a maximum tensile stress is generated at the specific position when the thin film section is displaced toward the hollow.

2. The physical quantity sensor according to claim 1, wherein
when the specific position is defined as a first position and the end on the bottom surface of the recess is defined as a second position, the thin film section is configured so that greater tensile stress is generated at the first position than at the second position when the thin film section is displaced toward the hollow.

3. The physical quantity sensor according to claim 1, wherein
the end of the bottom surface in the recess has a circular shape, and
the open end of the hollow has a circular shape.

4. A physical quantity sensor comprising:
a first substrate having a first surface and a second surface opposite to each other, and having a recess depressed from the second surface to provide a thin film section adjacent to the first surface; and
a second substrate having a first surface bonded to the first surface of the first substrate, and having a hollow depressed from the first surface at a portion facing the recess, wherein
the recess and the hollow have such sizes that a projected line defined by projecting an end of a bottom surface in the recess to the first surface of the first substrate surrounds an open end of the hollow,
the thin film section has a front surface on the first surface of the first substrate and a rear surface that is opposite to the front surface and is closer to the second surface of the first substrate than the front surface is, and
when a position on the rear surface of the thin film section intersecting an extended line that is along a normal direction to the first surface of the first substrate and passes through the open end of the hollow is defined as a first position, the end of the bottom surface in the recess is defined as a second position, a shortest distance between the first position and the second position is defined as L [μm], and a thickness of the thin film section is define as d [μm], $L > 1.28 \times d + 0.53$ is satisfied.

5. The physical quantity sensor according to claim 4, wherein
   the end of the bottom surface in the recess has a circular shape, and
   the open end of the hollow has a circular shape.

* * * * *